United States Patent
Oi

(10) Patent No.: US 6,532,260 B2
(45) Date of Patent: *Mar. 11, 2003

(54) PULSE TRANSMISSION DEVICE FOR USE IN LONG-DISTANCE COMMUNICATION

(75) Inventor: Masakazu Oi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,487

(22) Filed: Oct. 26, 1999

(65) Prior Publication Data

US 2002/0176493 A1 Nov. 28, 2002

(30) Foreign Application Priority Data

Apr. 19, 1999 (JP) .......................... 11-110856

(51) Int. Cl.$^7$ ................................ H03K 9/08
(52) U.S. Cl. ................ 375/238; 375/256; 375/257; 375/296; 370/205; 370/212; 327/31; 332/109; 332/115
(58) Field of Search ................ 375/219, 222, 375/238, 256, 257, 295, 296; 370/205, 212, 213; 327/31, 291; 329/311, 312, 313; 332/106, 107, 109, 112, 115

(56) References Cited

U.S. PATENT DOCUMENTS

| | | | | |
|---|---|---|---|---|
| 4,041,239 A | * | 8/1977 | Haass ........................... | 178/68 |
| 4,170,715 A | * | 10/1979 | Mizokawa ..................... | 178/68 |
| 5,347,544 A | * | 9/1994 | Garcia et al. .................. | 375/36 |
| 5,541,543 A | * | 7/1996 | Arnaud ......................... | 327/175 |
| 6,005,890 A | * | 12/1999 | Clow et al. ................... | 375/221 |
| 6,237,107 B1 | * | 5/2001 | Williams et al. ............. | 713/503 |
| 6,396,317 B1 | * | 5/2002 | Roller et al. ................. | 327/113 |

OTHER PUBLICATIONS

U.S. patent application Ser. No. 09/270,325, filed Mar. 16, 1999.

* cited by examiner

Primary Examiner—Stephen Chin
Assistant Examiner—Dac V. Ha
(74) Attorney, Agent, or Firm—Katten Muchin Zavis Rosenman

(57) ABSTRACT

A device for transmitting a pulse signal via a metallic line to a receiver end at which equalization is applied to the received pulse signal. The device includes a waveform adjustment unit which adjusts a pulse width in accordance with differences between characteristics of the metallic line and characteristics that are assumed for the equalization at the receiver end. The device further includes a transmission driver unit which transmits a pulse having the adjusted pulse width to the metallic line.

9 Claims, 15 Drawing Sheets

$W \cdot H^2$ : CONSTANT

PRIOR ART

ORIGINAL

AFTER PASSING THROUGH φ0.4 LINE AND √π EQUALIZATION

AFTER PASSING THROUGH φ0.9 LINE AND √π EQUALIZATION

PRIOR ART

PULSE TRANSMISSION DEVICE FOR USE IN LONG-DISTANCE COMMUNICATION

BACKGROUND OF THE INVENTION

1. Field of the Invention

The present invention relates to an ISDN basic service which achieves digital data transfer via metallic lines, and particularly relates to a long-distance transfer-pulse transmission device which transfers data a long distance via a metallic line (subscriber line) to a subscriber at a remote location.

2. Description of the Related Art

An ISDN basic service is designed and developed to achieve high-speed data transfer by using existing metallic lines which are conventionally used in analog communication. With regard to the ISDN basic service, a configuration shown in FIG. 8 is defined in JT-G961 of the TTC standard. In FIG. 8, a plurality of line terminals LT are connected to an end terminal (switch-end terminal) ET on the station side. On the household side, a network terminal NT is connected to various household communication devices such as a terminal adaptor TA and terminal elements TE. The network terminal NT has a one-to-one connection with one of the line terminals LT via a metallic line. In Japan, digital transfer is implemented on the metallic line by using time-division transfer technology.

The ISDN basic service as described above is designed with an upper limit of line loss equal to 50 dB by taking into consideration a line balance against the ground, cross-talks, a line quality, etc. With respect to a user at a remote location farther away than the line-loss upper limit of 50 dB, basically, no service is provided. An initial estimate at the time of starting the ISDN basic service was that 99% of the entire telephone network in Japan would be covered by the ISDN basic service. A recent spread of population distribution, however, has resulted in 2–3% of service use being accounted for by use of the service in the areas where the line loss exceeds 50 dB. In order to provide a proper service to customers in such areas, remote stations need to be established, which inevitably requires a large investment. Because of this, currently, the ISDN service is not provided to all the customers.

Accordingly, there is a need for a long-distance-transfer system which can render the ISDN basic service at a low cost without establishing remote stations to areas where line losses from the line terminals LT exceed 50 dB.

FIG. 9 is an illustrative drawing showing a configuration of a line terminal LT on the station side and a configuration of a network terminal NT on the household side. The line terminal LT has a U-point interface on the metallic-line side and a V-point interface on the device (e.g., switch) side, and includes a transmission driver 1, a receiver 2, an equalizer 3 (line termination), and a U-point/V-point-conversion unit 4. The network terminal NT has a U-point interface on the metallic-line side and a T-point interface on the household-communication-equipment side, and includes the transmission driver 1, the receiver 2, the equalizer 3, and a T-point/V-point-conversion unit 5.

In this related-art configuration, a flow of signals going downstream is as follows. The line terminals LT is connected to an upper-level device (e.g., switch) via the V-point interface, and receives commands from the upper-level device at the U-point/V-point-conversion unit 4. The U-point/V-point-conversion unit 4 changes speed of control signals and data so as to fit them to the U-point interface, and the transmission driver 1 sends them to the metallic line. The transmission driver 1 used in Japan is a U-point driver which attends to conversion to AMI signals.

In the network terminal NT, the receiver 2 receives signals that are degraded while traveling through the metallic line. The received signals have waveforms thereof reshaped by the equalizer 3. Then, the T-point/V-point-conversion unit 5 extracts a clock from the signals, and changes speed of the signals so as to fit them to the T-point interface. The transformed signals are supplied to the T points.

A flow of signals going upstream is as follows. The network terminal NT is connected to a lower-level device (e.g., a terminal adaptor, a terminal element, etc.) via the T-point interface, and receives data from the lower-level device at the T-point/V-point-conversion unit 5. The T-point/V-point-conversion unit 5 changes speed of status signals and data so as to fit them to the U-point interface. Timings of signal transmission to the U-point are determined by extracting a clock signal from the signals traveling downstream at the T-point/V-point/-conversion unit 5. The transmission driver 1 converts the signals into AMI signals, which are transmitted to the metallic line.

In the line terminal LT, the receiver 2 receives signals that are degraded while traveling through the metallic line. The received signals have waveforms thereof reshaped by the equalizer 3. Then, the U-point/V-point-conversion unit 4 identifies the status signals and data, and changes speed of the signals so as to fit them to the V-point interface with the upper-level device.

The equalizers 3 provided in the network terminal NT and the line terminal LT serves to correct signal degradation that is caused by the metallic line. This function of signal correction will be described below in detail.

The metallic line connecting between the network terminal NT and the line terminal LT serves as a subscriber line, and has frequency-to-line-loss characteristics as shown in FIG. 10 in accordance with distributed parameters thereof. In FIG. 10, a horizontal axis shows a frequency f (Hz), and a vertical axis shows a line loss LOSS (dB). The characteristics are shown with respect to different lengths of metallic lines. As can be seen from the frequency-to-loss characteristics of FIG. 10, the line loss LOSS is in proportion to the square root of the frequency (i.e., $f^{1/2}$) in a higher frequency region when a logarithm of the loss is considered. Namely, the higher the frequency, the greater loss the signal suffers. The lower the frequency, the easier the signals pass through the metallic line.

Frequency-to-line-loss characteristics inevitably vary, depending on parameters such as a type of a line, a diameter of a line, etc. In Japan, a type of a metallic line includes a lead cable, a paper insulated cable, a CCP cable line, etc., and a diameter of a line varies from $\Phi 0.4$ to $\Phi 0.9$. If all the frequency characteristics are averaged, a paper-insulated cable having a diameter of $\Phi 0.5$ may represent characteristics that are closest to the average characteristics. When the equalizer 3 is used for equalizing a signal degraded by a metallic-line cable, a paper-insulated cable having a diameter of $\Phi 0.5$ is used as a reference, and correction is made so as to cover the loss of this reference cable. In this manner, signal waveforms are corrected to have as little deformation as possible. This process is referred to as a square-root-f equalization.

FIG. 11 is an illustrative drawing for explaining a method of correcting signal waveforms.

The square-root-f equalization is made by combining gain characteristics of a flat amplifier, a first-order-slope amplifier, and a second-order-slope amplifier. The gain combined in this manner approximates for the frequency-to-loss characteristics of the paper-insulated cable with Φ0.5 that is used as a reference as described above. In this manner, losses generated along the line are corrected.

When the related-art transfer system between a station and a household is used, three schemes as follows can be regarded as a viable option that achieves a long-distance transfer of data.

1) Signal transmission levels are boosted in the line terminal LT and the network terminal NT. This insures a greater signal level of signals received by the receivers, so that proper signal exchanges are attainable without making any changes to the existing receiver circuits.

2) Signal receipt sensitivities of the receiver circuits are boosted in the line terminal LT and the network terminal NT. This insures that signals are received by the highly sensitive receivers without requiring the transmission side to boost its signal transmission level. In this case, proper signal exchanges are attainable without making any changes to the existing transmission circuits.

3) A signal transmission level and a signal receipt sensitivity are boosted in either the line terminal LT or the network terminal NT. This attains proper exchanges of signals without making any changes to the existing transmission and receiver circuits in the other device communicating with the one in which changes are made.

In order to provide a long-distance data-transfer service to new customers without requiring changes to existing facilities, the scheme 3) among all the three schemes identified above is most appropriate. A station facility is already in existence, and cannot be changed easily. When new users are to be provided with the ISDN basic services, therefore, new network terminals NT are installed in the user households to meet the demand. Namely, it is desirable to apply the scheme 3) to the network terminals NT newly provided in the user households.

FIG. 12 is an illustrative drawing showing a configuration which is used for achieving a long-distance data transfer.

In an example of FIG. 12, measures to achieve a long-distance data transfer are provided in the network terminal NT in the household because of the reasons identified above. In FIG. 12, the transmission driver 1, the receiver 2, the equalizer 3, and the T-point/V-point-conversion unit 5 are the same as those previously described. The configuration of FIG. 12 differs from the configuration previously described in that a transmission amplifier 6 is provided on the transmission side of the transmission driver 1 so as to amplify a transmission level by α [dB] before transmitting a signal to the metallic line, and that a receipt amplifier 7 is provided on the receipt side of the receiver 2 to amplify a received signal by α [dB] before the receiver 2 receives the signal.

This system which is designed for long-distance data transfer amplifies a transmission level by α [dB] in the household network terminal NT, and amplifies a receipt sensitivity by α [dB] in the household network terminal NT, thereby lifting an upper limit of line loss by α dB from 50 dB of the conventional ISDN basic system, for example. This makes it possible to provide the ISDN basic service to users who are located farther away by covering an additional distance that is commensurate with the line loss of α [dB].

Such a system as described above, however, experiences a signal deformation that is caused by distribution parameters of a metallic line as signals pass through the metallic line. This deformation prevents the receiver side to correctly receive the signals. Namely, the signal deformation serves as a factor to limit a distance that can be extended.

FIGS. 13A and 13B are illustrative drawings for explaining an effect of signal deformation on a long-distance communication.

FIG. 13A shows a configuration of a communication system including the line terminal LT and the network terminal NT, and FIG. 13B shows a configuration of a communication system directed to a long-distance communication between the line terminal LT and the network terminal NT. In FIG. 13A, a point B marks a distance from the line terminal LT that corresponds to a line loss of 50 dB, and the network terminal NT is located at the point B. The network terminal NT transmits a rectangular pulse to the metallic line as shown in FIG. 13A. In FIG. 13B, the transmission amplifier 6 and the receipt amplifier 7 (not shown) boost gains of signal transmission and signal receipt by α dB so as to extend a distance of communication by a corresponding length. As a result, the network terminal NT is located at a point A, which is farther away than the point B from the line terminal LT.

At the line terminal LT, a signal transmitted from the network terminal NT is received by adjusting settings of the receiver circuit and the equalizer based on an assumption that the transmitted signal was comprised of rectangular pulses having no deformation at the point B. In the long-distance-communication system shown in FIG. 13B, however, a transmitted signal degrades as it propagates from the point A to the point B because of distributed parameters of the communication line. Even through the signal has no deformation at the point A when it is transmitted, the signal may have a deformed shape at the point B as shown in FIG. 13B, and the deformed shape may be completely different from the original rectangular shape. In this case, a pulse shape at the point B is different from a rectangular pulse shape that the line terminal LT assumes as a shape that should be observed at a transmission point. As a result, the line terminal LT may fail to correctly receive the signal from the network terminal NT.

Such signal deformation varies depending on a type of a metallic line such as a configuration and a diameter thereof. What type of a metallic line is actually used, therefore, may determine whether a signal can be correctly received at the receiver end. As previously described, the equalizer of the receiver estimates a frequency-to-loss characteristic of a metallic line by using as a reference a frequency-to-loss characteristic of a paper-insulated cable having a diameter of Φ0.5, and sets a square-root-f characteristic based on the estimate. If the cable actually used differs greatly from the paper-insulated cable having a diameter of Φ0.5, the square-root-f equalization characteristic cannot be a proper estimate of the actual frequency characteristic of the cable. This may lead to a significant deformation in signals obtained after equalization.

FIG. 14 is an illustrative drawing for explaining a gap between the square-root-f equalization characteristic and an actual frequency-to-loss characteristic.

In FIG. 14, a horizontal axis represents frequency, and a vertical axis represents gain or loss. A frequency-to-loss characteristic of a Φ0.4 cable and a frequency-to-loss characteristic of a Φ0.9 cable are shown along with the square-root-f characteristic that approximates for the Φ0.5 cable. As can be seen from the figure, the Φ0.4 cable has losses greater than the square-root-f gains in a frequency region lower than a nyquist frequency ($f_0/2$), and has losses smaller than the square-root-f gains in a frequency region higher than the nyquist frequency. Because of this, a signal obtained after the square-root-f equalization will have enhanced high frequency components compared to an original signal. In the case of the Φ0.9 cable, on the other hand, low frequency components are enhanced after the equalization.

FIGS. 15A through 15C are illustrative drawings for explaining various signal waveforms obtained after the square-root-f equalization.

FIG. 15A shows an original rectangular pulse, which is transmitted to a metallic line. A signal obtained after propagating through a Φ0.4 metallic line and the subsequent square-root-f equalization is shown in FIG. 15B. This signal has a pulse width narrower than the original pulse, and includes conspicuously enhanced high-frequency components. A signal obtained after propagating through a Φ0.9 metallic line and the subsequent square-root-f equalization is shown in FIG. 15C. This signal has a pulse width broader than the original pulse, and has enhanced low-frequency components. In this manner, a signal waveform obtained after the equalization has a narrower pulse width and enhanced high-frequency components if the diameter of the cable is thinner than Φ0.5, and has a broader pulse width and enhanced low-frequency components if the diameter of the cable is thicker than Φ0.5.

Accordingly, a long-distance data-transfer system, which boosts gains of transmission signals and received signals, suffers a drawback as follows. When gains are boosted by α dB, a communication distance is supposed to be extended by an additional length commensurate with the α dB gain. Depending on a type and a diameter of a cable, however, an extension of the distance is not as long as an expected length that is based on an assumption of use of a reference cable (e.g., a paper-insulated cable with a Φ0.5 diameter).

Accordingly, there is a need for a long-distance data-transfer scheme which can extend a communication distance by a desired length regardless of a type of a metallic line used in the system by adapting to the type of the actually used metallic line.

SUMMARY OF THE INVENTION

Accordingly, it is a general object of the present invention to provide a long-distance data-transfer scheme which can satisfy the need described above.

It is another and more specific object of the present invention to provide a long-distance data-transfer scheme which can extend a communication distance by a desired length regardless of a type of a metallic line used in the system by adapting to the type of the actually used metallic line.

In order to achieve the needs described above according to the present invention, a device for transmitting a pulse signal via a metallic line to a receiver end at which equalization is applied to the received pulse signal includes a waveform adjustment unit which adjusts a pulse width in accordance with differences between characteristics of the metallic line and characteristics that are assumed for the equalization at the receiver end, and a transmission driver unit which transmits a pulse having the adjusted pulse width to the metallic line.

In the device described above, a pulse width is adjusted to take into account differences between characteristics of the metallic line and characteristics that are assumed for the equalization at the receiver end. Because of such a pulse width adjustment at the transmission end, a pulse signal obtained at the receiver end after the equalization of the received pulse will have a desired pulse width. This allows the receiver end to correctly receive signals regardless of a type of the actually used metallic line even when a communication distance is extended by boosting a transmission signal level.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
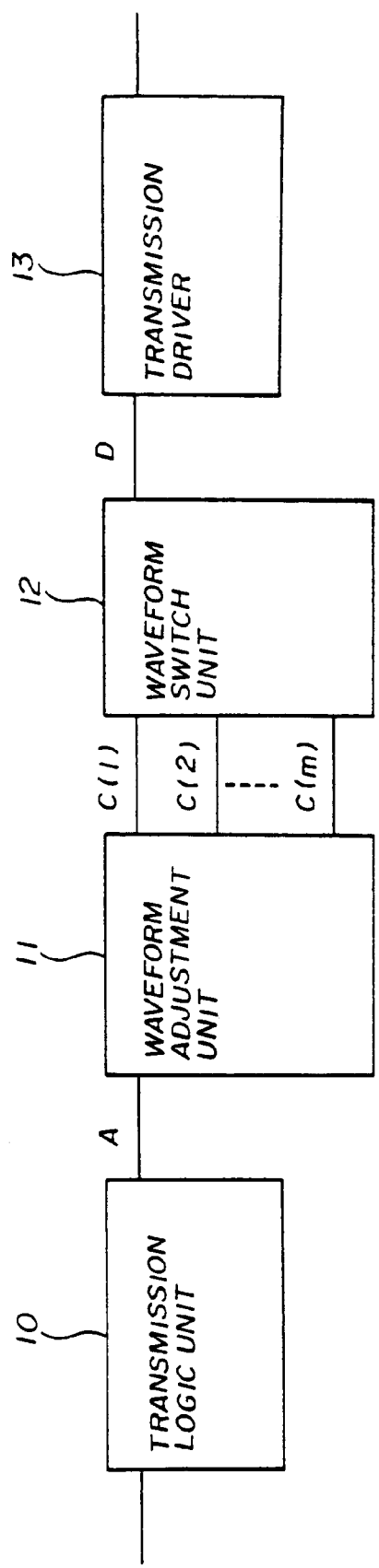
FIG. 1 is a block diagram of a long-distance-data-transfer pulse-transmission device according to the present invention.

FIG. 1 is a block diagram of a long-distance-data-transfer pulse-transmission device according to the present invention. This device is used in a transmission circuit in the line terminal LT on the station side or in the network terminal NT on the household side in order to boost gains by α dB from an upper limit of a line loss (e.g., 50 dB). For the sake of clarity of explanation, FIG. 1 shows only a transmission-circuit portion without regard to the entirety of the line terminal LT or the network terminal NT.

Figure 12:
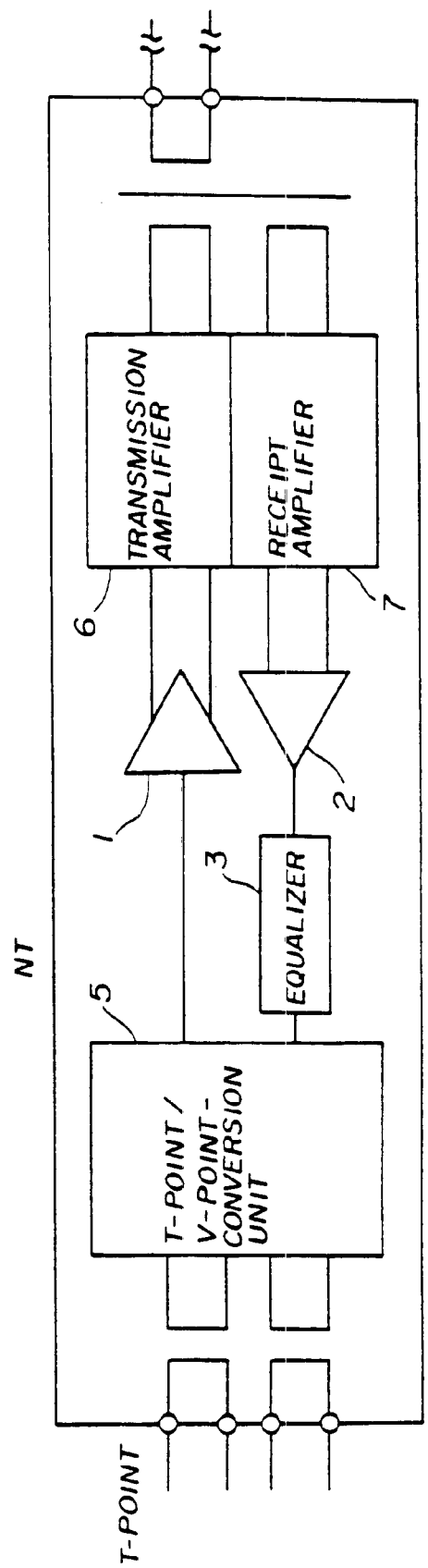
FIG. 12 is an illustrative drawing showing a configuration which is used for achieving a long-distance data transfer.
Figure 13A:
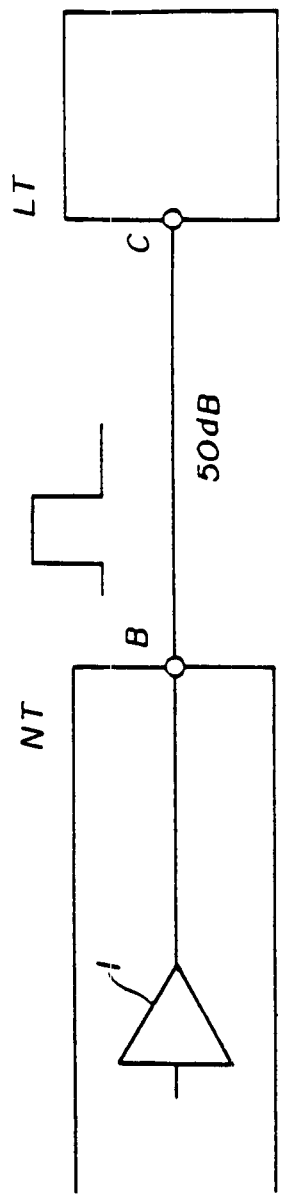
FIGS. 13A and 13B are illustrative drawings for explaining an effect of signal deformation on a long-distance communication.
Figure 13B:
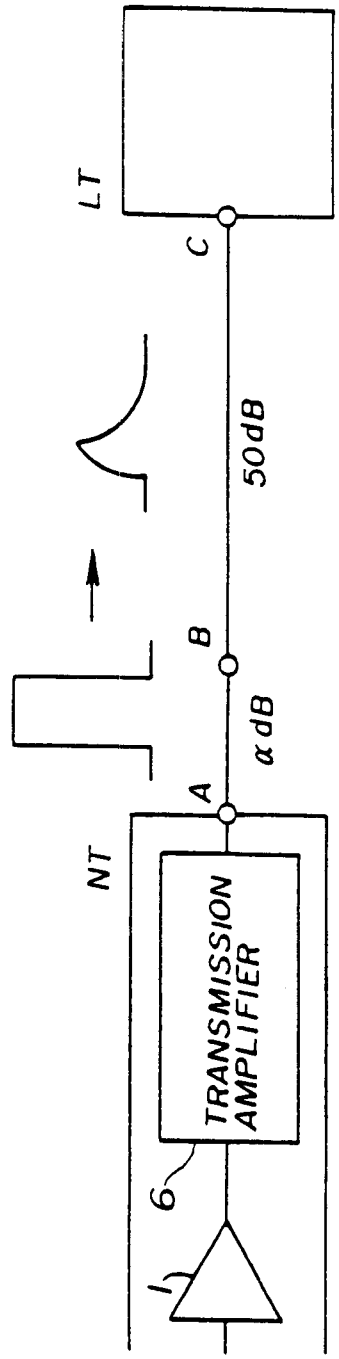
Figure 14:
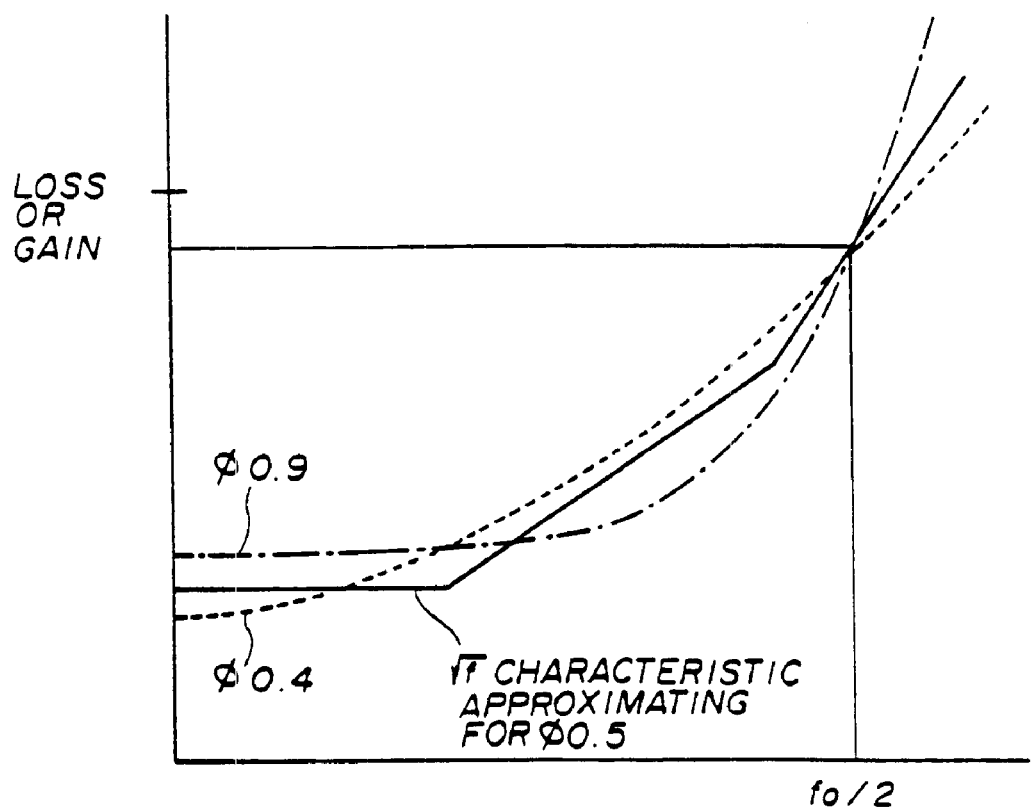
FIG. 14 is an illustrative drawing for explaining a gap between a square-root-f equalization characteristic and an actual frequency-to-loss characteristic.
Figure 15A:
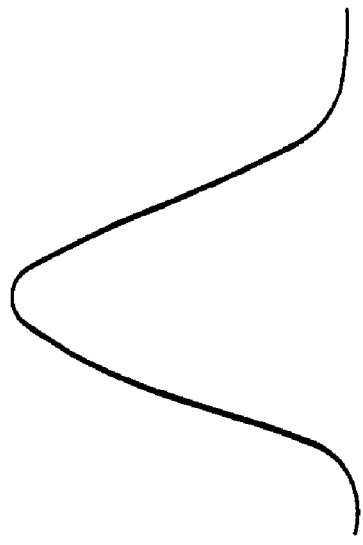
FIGS. 15A through 15C are illustrative drawings for explaining various signal waveforms obtained after the square-root-f equalization.
Figure 15B:
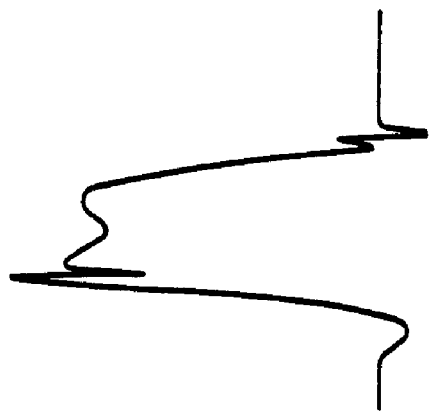
Figure 15C:
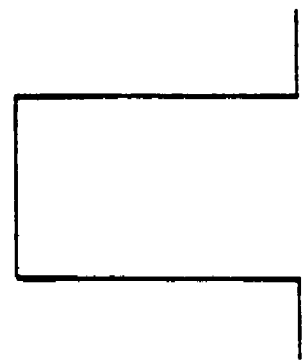

The device of FIG. 1 includes a transmission logic unit 10, a waveform adjustment unit 11, a waveform switch unit 12, and a transmission driver 13. The transmission logic unit 10 generates a rectangular pulse as a driver-source signal A. The waveform adjustment unit 11 receives the driver-source signal A from the transmission logic unit 10, and adjusts a waveform of the driver-source signal A in terms of a pulse width thereof, for example. In FIG. 1, C(1) through C(m) represent respective pulse widths, which vary from those narrower than a desired pulse width to those broader than the desired pulse width. The waveform switch unit 12 selects one of the pulse widths C(1) through C(m) supplied as signals output from the waveform adjustment unit 11, and supplies a transmission signal D having a selected pulse width. The transmission driver 13 converts the transmission signal D having the selected pulse width into an AMI signal suitable for the U point, and transmits the converted signal to a metallic line (subscriber line) via an amplifier such as the transmission amplifier 6 of FIG. 12.

The long-distance-data-transfer pulse-transmission device of FIG. 1 selects a pulse width of a transmission signal in accordance with a type of a subscriber line such as a configuration and a diameter thereof. Here, a receiver circuit at the other end of the subscriber line has an equalizer thereof set to a square-root-f equalization characteristic that is obtained by using a paper-insulated cable with a Φ0.5 diameter as a reference, for example.

Where the actual line has a diameter of Φ0.4, for example, a pulse width of a transmission signal is selected so as to be wider than a desired pulse width, which is the pulse width that should be observed at the receiver end after the equalization. With such selection of a pulse width, a waveform obtained at the receiver end after the square-root-f equalization ends up having a proper pulse width because the waveform obtained after propagating through the Φ0.4 line and the subsequent square-root-f equalization tends to have a pulse width narrower than that of the originally transmitted pulse. Namely, transmission of a signal having a pulse width wider than the desired pulse width results in a proper pulse width being obtained after the square-root-f equalization, thereby reducing undesirable signal deformation.

Where the actual line has a diameter of Φ0.9, on the other hand, a pulse width of a transmission signal is selected so as to be narrower than the desired pulse width. With such selection of a pulse width, a waveform obtained at the receiver end after the square-root-f equalization ends up having a proper pulse width because the waveform obtained after propagating through the Φ0.9 line and the subsequent square-root-f equalization tends to have a pulse width wider than that of the originally transmitted pulse. Namely, transmission of a signal having a pulse width narrower than the desired pulse width results in a proper pulse width being obtained after the square-root-f equalization, thereby reducing undesirable signal deformation.

Figure 2:
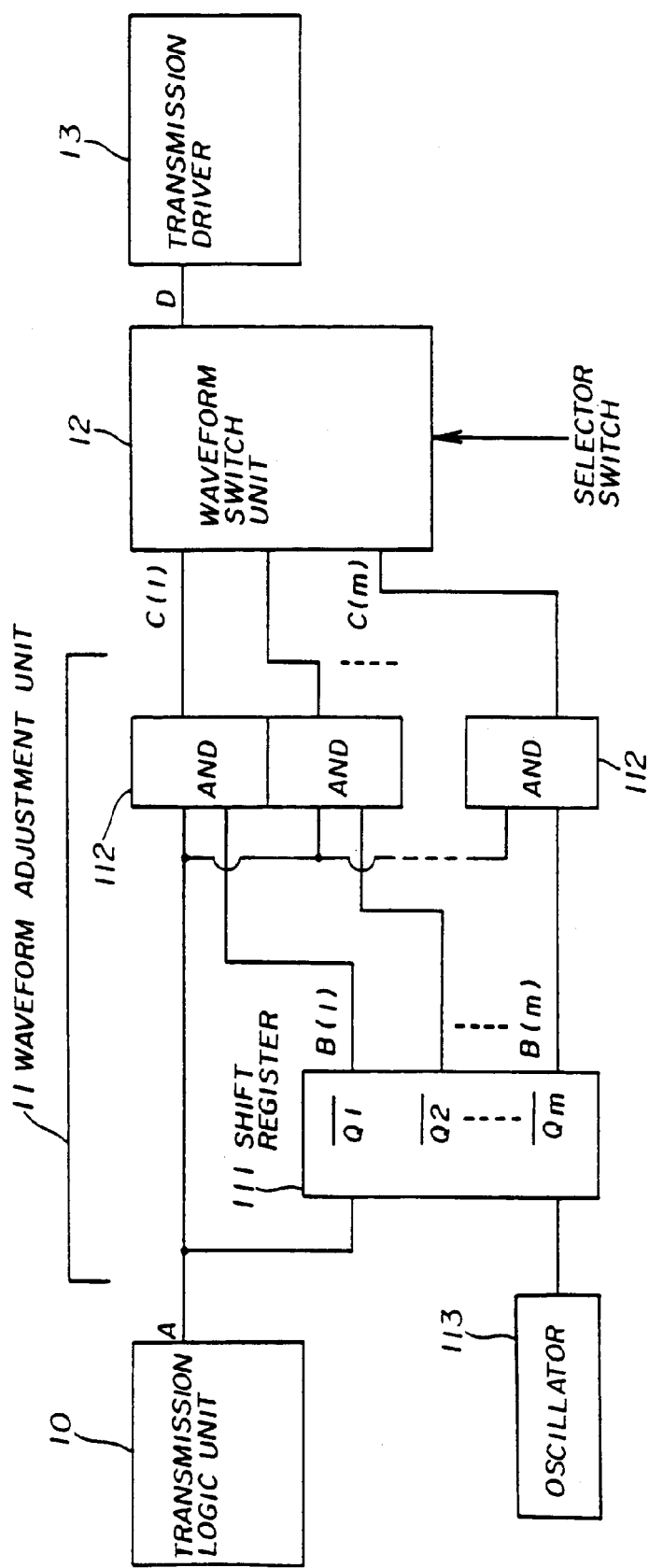
FIG. 2 is a circuit diagram of the long-distance-data-transfer pulse-transmission device according to an embodiment of the present invention.

FIG. 2 is a circuit diagram of the long-distance-data-transfer pulse-transmission device according to an embodiment of the present invention.

In FIG. 2, the transmission logic unit 10, the waveform switch unit 12, and the transmission driver 13 are the same as those of FIG. 1, and a detailed structure of the waveform adjustment unit 11 is shown. The waveform adjustment unit 11 includes a shift register 111, AND circuits 112, and an oscillator 113. The shift register 111 has m stages, and delays an input signal at each stage until a total of m-stage delays is obtained. The AND circuits 112 are provided as many as there are stages in the shift register 111. The oscillator 113 supplies timing pulses to the shift register 111. The driver-source signal A from the transmission logic unit 10 is input to an input node of the shift register 111, and, also, is input to one of the two input nodes of each AND circuit 112. Output nodes Q1 through Qm of the shift register 111 supply delayed signals B(1) through B(m), which are input to the other input node of the AND circuits 112, respectively. The AND circuits 112 outputs the output signals C(1) through C(m).

The output signals C(1) through C(m) are supplied from the AND circuits 112 to the waveform switch unit 12. The waveform switch unit 12 includes a m-to-1 selector, which selects one of the output signals C(1) through C(m) in accordance with a selector switch signal supplied from a controller (not shown). The selected one of the output signals C(1) through C(m) is supplied as the transmission signal D to the transmission driver 13.

Figure 3:
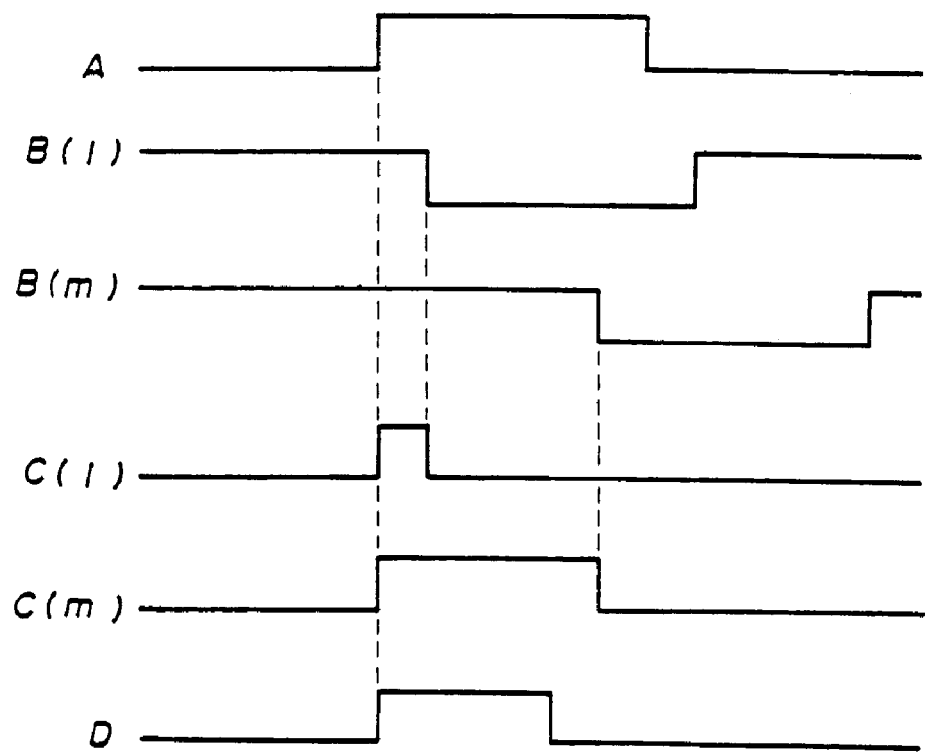
FIG. 3 is a timing chart showing various signals for explaining an operation of the long-distance-data-transfer pulse-transmission device.

FIG. 3 is a timing chart showing various signals for explaining an operation of the long-distance-data-transfer pulse-transmission device.

FIG. 3 shows the driver-source signal A, the delayed signals B(1) and B(m) output from the shift register 111, the output signals C(1) and C(m) of the AND circuits 112, and the transmission signal D selected by the waveform switch unit 12. The driver-source signal A is delayed by the shift register 111 by one stage to m stages. The delayed signals B(1) through B(m) are then supplied to the AND circuits 112, each of which obtains a logic product with the driver-source signal A. The AND circuits 112 generate the output signals C(1) through C(m) each having a different pulse width. The output signals C(1) through C(m) are supplied to the waveform switch unit 12, and the waveform switch unit 12 selects an appropriate pulse width based on the selector switch signal by taking into account a type of a line used in the system. One of the output signals C(1) through C(m) that has the selected pulse width is used as the transmission signal D that drives the transmission driver 13.

Figure 4:
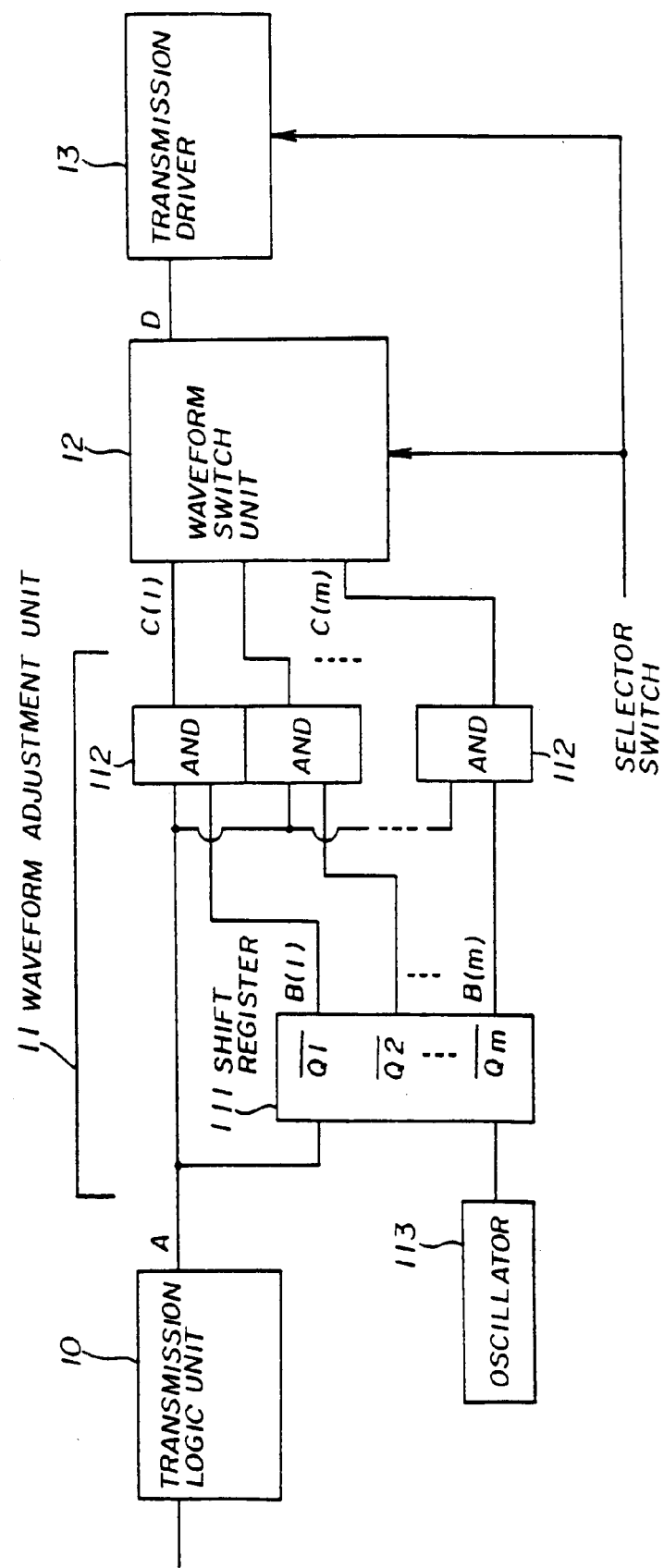
FIG. 4 is a circuit diagram of the long-distance-data-transfer pulse-transmission device according another embodiment of the present invention.

FIG. 4 is a circuit diagram of the long-distance-data-transfer pulse-transmission device according another embodiment of the present invention.

In FIG. 4, the transmission logic unit 10, the waveform adjustment unit 11, and the waveform switch unit 12 are the same as those of FIG. 2. This embodiment differs from the previous embodiment in that a variable transmission driver 13a is provided in place of the transmission driver 13. The variable transmission driver 13a adjusts a transmission level (i.e., a height of the pulse) in accordance with a control signal supplied from the controller (not shown). The control signal for adjusting the transmission level may be the same signal as the selector switch signal.

Figures 5A, 5B:
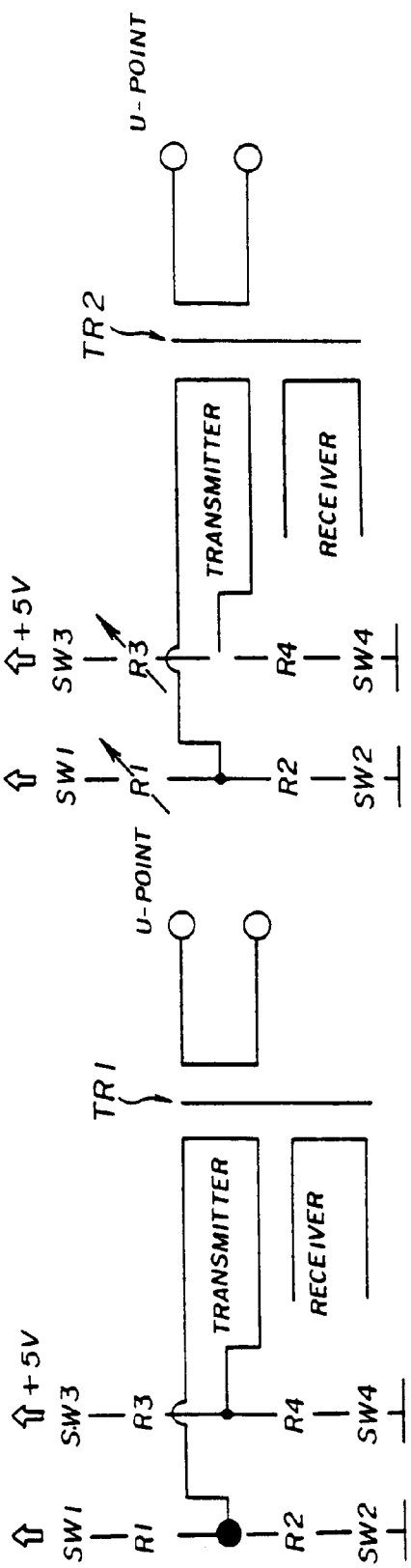
FIGS. 5A and 5B are circuit diagrams showing a configuration of a variable transmission driver in comparison with a configuration of a transmission driver.

FIGS. 5A and 5B are circuit diagrams showing a configuration of the variable transmission driver 13a in comparison with a configuration of the transmission driver 13.

FIG. 5A shows the transmission driver 13 for the purpose of comparison of its configuration with that of the variable transmission driver 13a, and FIG. 5B shows the configuration of the variable transmission driver 13a.

As shown in the figures, the transmission driver 13 includes switches SW1 through SW4, resistors R1 through R4, and a transformer TR1. The variable transmission driver 13a according to the present invention includes the switches SW1 through SW4, the resistors R2 and R4, variable resistors R1 and R3, and the transformer TR1. In both configurations, the transformer TR1 is driven by turning on the switches SW1 and SW4 when a positive pulse is to be transmitted, and is driven by turning on the switches SW2 and SW3 when a negative pulse is to be transmitted. Further, when signals are received, the switches SW2 and SW4 are turned on so as to match a receiver impedance at the point U. In the variable transmission driver 13a, the variable resistors R1 and R3 have resistance thereof adjusted to control a driver current, thereby controlling the transmission level.

In this embodiment, not only the pulse width of a transmission signal is adjusted, but also the transmission level (i.e., a height of a pulse) is adjusted. In general, when a transmission signal supplied to a metallic line has too strong a transmission power, the signal may interfere with other signals on other lines. If a transmission level in the present invention stays the same after an adjustment of a pulse width, the transmission power is changed from an originally stipulated power. In order to avoid undesirable signal interference, the transmission level is also adjusted in accordance with the adjustment of the pulse width so as to maintain the same transmission power.

Figure 6A:
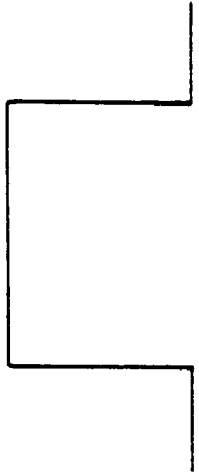
FIGS. 6A through 6C are illustrative drawings for explaining adjustment of a transmission level.
Figure 6B:
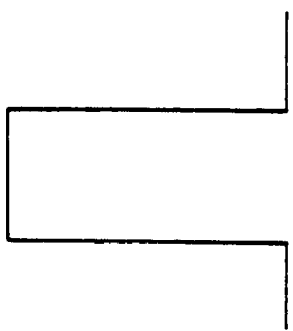
Figure 6C:
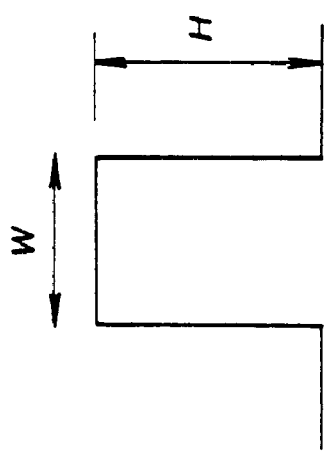

FIGS. 6A through 6C are illustrative drawings for explaining adjustment of a transmission level.

FIGS. 6A through 6C show various pulse waveforms each having a different pulse width and pulse height. As shown in FIGS. 6A through 6C, a transmission level is adjusted such that a transmission power stays the same. Here, the transmission power is defined as $W*H^2$ where W is a pulse width and H is a pulse height.

This embodiment has been described with reference to a case where the transmission power stays the same in order to avoid signal interference with other lines. The present invention is not limited to this particular embodiment. A relationship between a transmission level and a pulse width can be different from the relationship described above as long as interference with other lines can be avoided. A relationship between a transmission level and a pulse width may be decided so as to achieve the smallest waveform deformation at the receiver end.

Figure 7:
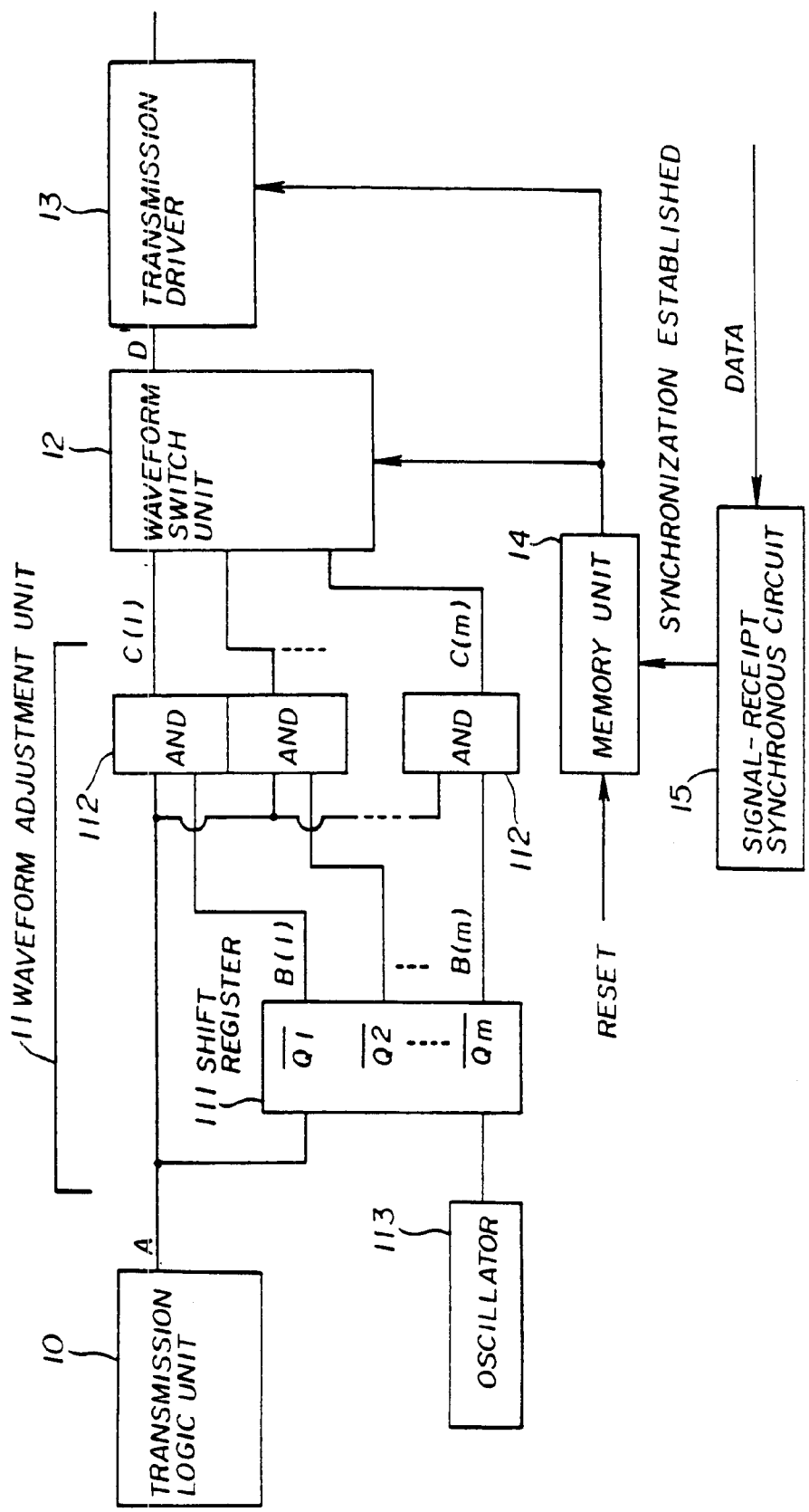
FIG. 7 is a circuit diagram of the long-distance-data-transfer pulse-transmission device according to yet another embodiment of the present invention.
Figure 8:
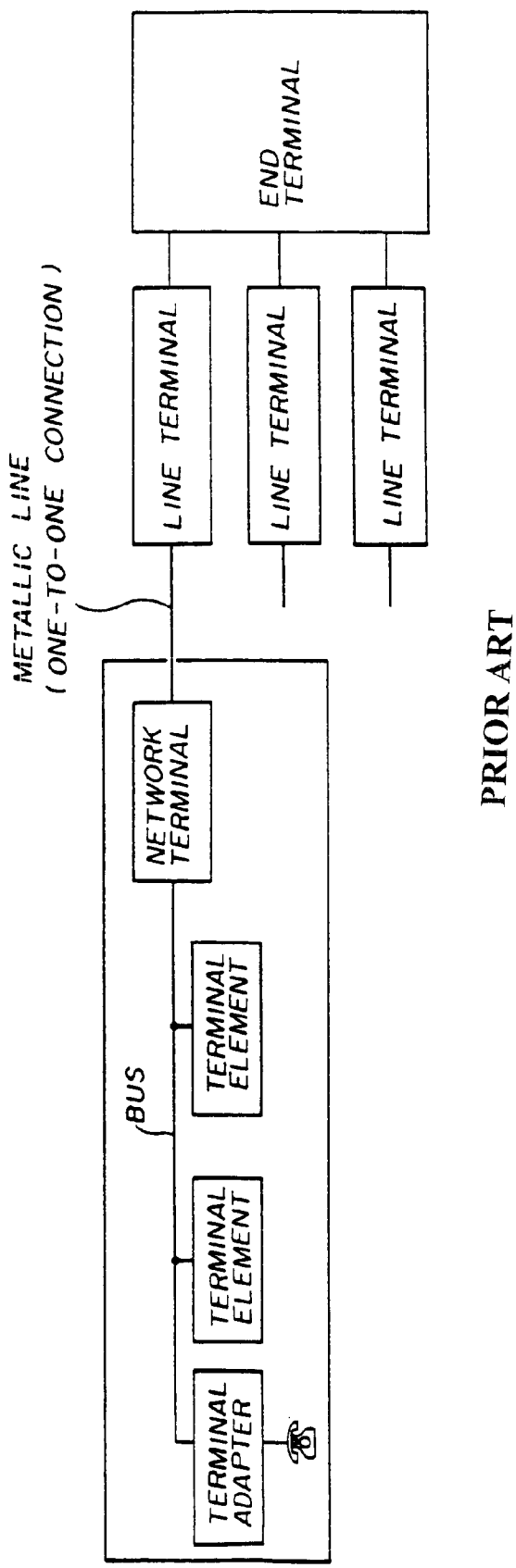
FIG. 8 is an illustrative drawing showing a standard configuration of the ISDN basic service in compliance with the TTC standard.
Figure 9:
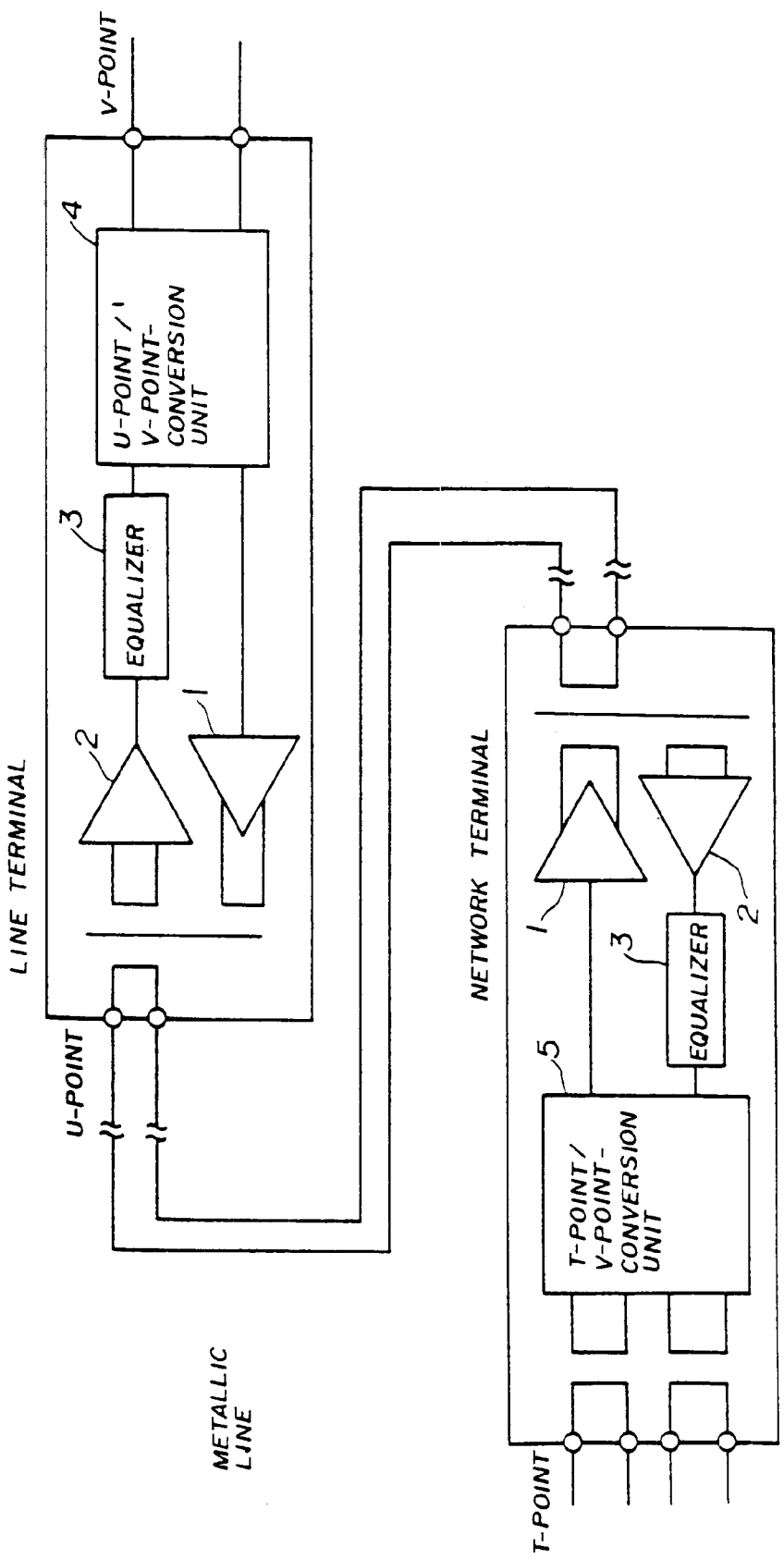
FIG. 9 is an illustrative drawing showing a configuration of a line terminal on the station side and a configuration of a network terminal on the household side.
Figure 10:
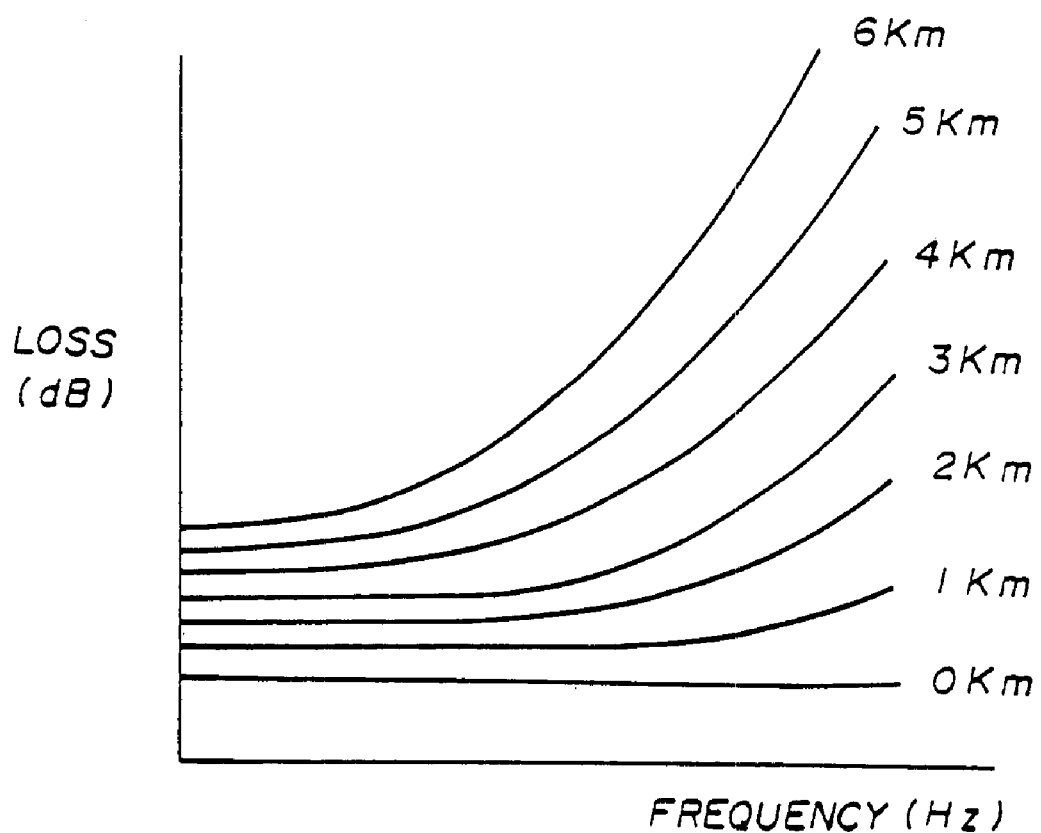
FIG. 10 is an illustrative drawing showing frequency-to-loss characteristics of a metallic line.
Figure 11:
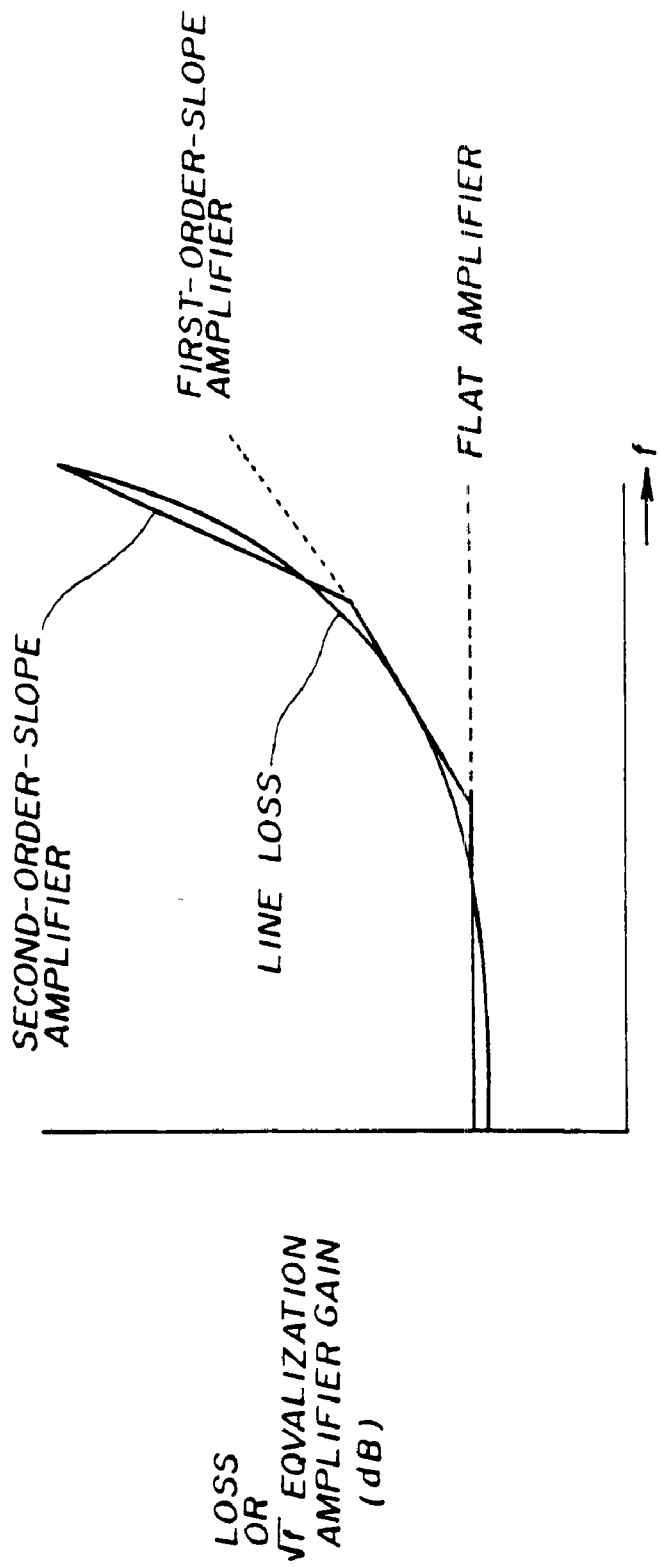
FIG. 11 is an illustrative drawing for explaining a method of correcting signal waveforms.

FIG. 7 is a circuit diagram of the long-distance-data-transfer pulse-transmission device according to yet another embodiment of the present invention.

In this embodiment, the transmission logic unit 10, the waveform adjustment unit 11, the waveform switch unit 12, and the variable transmission driver 13a are the same as those of the previous embodiment shown in FIG. 4. The configuration of FIG. 7 differs from the configuration of FIG. 4 in that a memory unit 14 and a signal-receipt synchronous circuit 15 are newly provided.

The signal-receipt synchronous circuit 15 receives data from the other end when a device at the other end sends the data as a synchronization establishment notice. The synchronization establishment notice is sent from the device at the other end when this device successfully establishes synchronism with received signals. By receiving the synchronization establishment notice from the other end, a device at this end learns that signals transmitted from this end are successfully received at the other end. The memory unit 14 stores data regarding various combinations between a pulse width and a transmission level that achieve a constant transmission power for the variable transmission driver 13a.

In this embodiment, data of a combination between a pulse width and a transmission level that achieves a constant transmission level is read from the memory unit 14, and a signal is transmitted by using the pulse width and the transmission level specified in the data. Until the signal-receipt synchronous circuit 15 receives a synchronization establishment notice from the other end, a combination of a pulse width and a transmission level is changed at constant intervals so as to change a signal waveform to be transmitted. When synchronization is established, data of a currently used combination is latched. Thereafter, signals are transmitted by using a pulse width and a transmission level specified in the latched data.

In this manner, a signal waveform to be used is stored in memory once synchronization is established. A next signal transmission can thus be carried out without a delay. When a position of a device is moved, the memory which stores combination data is reset to initialize the contents thereof.

According to the present invention as described above, a communication distance is reliably extended by adjusting a signal waveform in accordance with characteristics of an actually used communication line, thereby achieving a stable long-distance data transfer in an ISDN system which boosts signal levels with an aim of extending a communication distance.

Further, the present invention is not limited to these embodiments, but various variations and modifications may be made without departing from the scope of the present invention.

The present application is based on Japanese priority application No. 11-110856 filed on Apr. 19, 1999, with the Japanese Patent Office, the entire contents of which are hereby incorporated by reference.

What is claimed is:

1. A device for transmitting a pulse signal via a metallic line to a receiver end at which equalization is applied to the received pulse signal, comprising:

a waveform adjustment unit which adjusts a pulse width of the pulse signal transmitted via the metallic line by selecting the pulse width without feedback control in accordance with differences between characteristics of the metallic line actually used and characteristics that are assumed for the equalization at the receiver end; and a transmission driver unit which transmits a pulse having the adjusted pulse width adjusted by said waveform adjustment unit to the metallic line.

2. The device as claimed in claim 1, wherein said waveform adjustment unit adjusts the pulse width such that a pulse obtained at the receiver end by applying the equalization to the pulse having the adjusted pulse width and having passed through the metallic line has a predetermined pulse width.

3. The device as claimed in claim 1, further includes an amplifier unit which amplifies the pulse having the adjusted pulse width prior to the transmission to the metallic line.

4. The device as claimed in claim 1, wherein said transmission driver unit adjusts a transmission level at which the pulse having the adjusted pulse width is transmitted to the metallic line.

5. The device as claimed in claim 4, wherein the transmission level is adjusted in response to the adjusted pulse width such as to achieve a constant transmission power regardless of the adjusted pulse width.

6. A device for transmitting a pulse signal via a metallic line to a receiver end at which equalization is applied to the received pulse signal, comprising:

a waveform adjustment unit which adjusts a pulse width of the pulse signal transmitted via the metallic line in accordance with differences between characteristics of the metallic line in accordance with differences between characteristics that are assumed for the equalization at the receiver end;

a transmission driver unit which transmits a pulse having the adjusted pulse width adjusted by said waveform adjustment unit to the metallic line, wherein said transmission driver unit adjusts a transmission level at which the pulse having the adjusted pulse width is transmitted to the metallic line; and the device as claimed 4, further comprising A memory unit which stores data of different combinations between a pulse width and a transmission level, wherein the data of a selected one of the combinations is supplied to said transmission driver unit to transmit a pulse having such a pulse width and a transmission level as specified in the supplied data, the selected one of the combinations being successively changed until the device receives from the receiver end a synchronization establishment notice indicating an establishment of synchronization for the received pulse signal of the receiver end.

7. The device as claimed in claim 6, wherein the selected one of the combinations is latched when the synchronization establishment notice is received.

8. A device for transmitting a pulse signal via a metallic line to a receiver end at which equalization based on assumed characteristics of the metallic line is applied, comprising:

a waveform adjustment unit which adjusts a pulse width of the pulse signal transmitted via the metallic line by selecting the pulse width without feedback control such as to compensate for differences between characteristics of the metallic line actually used and the assumed characteristics; and a transmission driver unit which transmits a pulse having the adjusted pulse width adjusted by said waveform adjustment unit to the metallic line.

9. A device for transmitting a pulse signal via a metallic line, wherein equalization is applied at a receiver end of the metallic line, comprising:

a waveform adjustment unit which adjusts a pulse width of the pulse signal transmitted via the metallic line by selecting the pulse width without feedback control from the metallic line; and a transmission driver unit which transmits a pulse having the adjusted pulse width adjusted by said waveform adjustment unit to the metallic line, wherein the adjusted pulse width is such that a pulse obtained at the receiver end by applying the equalization to the pulse having the adjusted pulse width and having passed through the metallic line has a predetermined pulse width.

* * * * *